United States Patent
Kim et al.

(10) Patent No.: US 7,512,843 B2
(45) Date of Patent: Mar. 31, 2009

(54) APPARATUS AND METHOD FOR INTERLEAVING CHANNELS IN A MOBILE COMMUNICATION SYSTEM

(75) Inventors: Dong-Hee Kim, Yongin-si (KR);
Hwan-Joon Kwon, Suwon-si (KR);
Youn-Sun Kim, Seongnam-si (KR);
Jin-Kyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 502 days.

(21) Appl. No.: 11/289,570

(22) Filed: Nov. 30, 2005

(65) Prior Publication Data
US 2006/0156172 A1    Jul. 13, 2006

(30) Foreign Application Priority Data
Nov. 30, 2004   (KR)   ............. 10-2004-0099462

(51) Int. Cl.
*H03M 13/27* (2006.01)
(52) U.S. Cl. ............... 714/701; 714/702; 714/755
(58) Field of Classification Search ............ 714/701, 714/702, 755
See application file for complete search history.

(56) References Cited

U.S. PATENT DOCUMENTS

| | | | |
|---|---|---|---|
| 6,298,463 B1 | 10/2001 | Bingeman et al. | |
| 6,334,197 B1 * | 12/2001 | Eroz et al. ............... | 714/701 |
| 6,427,214 B1 * | 7/2002 | Li et al. ............... | 714/701 |
| 6,553,516 B1 * | 4/2003 | Suda et al. ............... | 714/702 |
| 6,622,281 B1 * | 9/2003 | Yun et al. ............... | 714/790 |
| 6,637,000 B2 * | 10/2003 | Rowitch et al. ............. | 714/755 |
| 6,772,391 B1 * | 8/2004 | Shin .................... | 714/786 |
| 6,971,050 B1 * | 11/2005 | Ohbuchi et al. ............. | 714/701 |
| 7,082,168 B2 * | 7/2006 | Coffey et al. ............. | 375/262 |
| 7,085,985 B2 * | 8/2006 | Cameron et al. ........... | 714/755 |
| 7,085,986 B2 * | 8/2006 | Nefedov ................ | 714/755 |
| 7,137,044 B2 * | 11/2006 | Ha et al. ............... | 714/701 |
| 7,155,642 B2 * | 12/2006 | Han ................... | 714/701 |
| 7,170,432 B2 * | 1/2007 | Ettorre .................. | 341/81 |
| 7,200,181 B2 * | 4/2007 | Kim et al. ............... | 375/262 |
| 7,210,076 B2 * | 4/2007 | Maru .................. | 714/702 |

FOREIGN PATENT DOCUMENTS

| | | |
|---|---|---|
| JP | 2003-152551 | 5/2003 |
| KR | 10-2002-0078778 | 10/2002 |

(Continued)

*Primary Examiner*—Stephen M Baker
(74) *Attorney, Agent, or Firm*—Roylance, Abrams, Berdo and Goodman, L.LP.

(57) ABSTRACT

An apparatus and method interleaving symbols coded by a turbo encoder in a communication system that uses the turbo encoder for encoding transmission information into coded systematic symbols and at least one parity symbol pair, and maps the coded symbols using a second or higher modulation order before transmission. An interleaver controller performs a control operation of cyclic-shifting the systematic symbols among the symbols coded by the turbo encoder depending on a size of a physical packet to be transmitted, the number of transmission slots, and the modulation order, using an equation of $(K \times c + k) \mod R$, and cyclic-shifting redundancy symbols constituting the remaining size of the coded symbols to be transmitted, using an equation of $\text{floor}\{(K \times c + k)/D\} \mod R$. An interleaver cyclic-shifts input symbols under the control of the interleaver controller.

16 Claims, 11 Drawing Sheets

FOREIGN PATENT DOCUMENTS

| | | |
|---|---|---|
| KR | 10-2003-0065662 | 8/2003 |
| RU | 2 187 196 | 8/2002 |
| RU | 2 210 185 | 8/2003 |
| WO | WO 02/069504 | 9/2002 |
| WO | WO 03/044965 | 5/2003 |

\* cited by examiner

APPARATUS AND METHOD FOR INTERLEAVING CHANNELS IN A MOBILE COMMUNICATION SYSTEM

PRIORITY

This application claims the benefit under 35 U.S.C. § 119 (a) of an application entitled "Apparatus and Method for Interleaving Channels in a Mobile Communication System" filed in the Korean Intellectual Property Office on Nov. 30, 2004 and assigned Serial No. 2004-99462, the entire contents of which are hereby incorporated by reference.

BACKGROUND OF THE INVENTION

1. Field of the Invention

The present invention relates generally to a communication apparatus and method in a mobile communication system. More particularly, the present invention relates to an apparatus and method for interleaving channels in a mobile communication system.

2. Description of the Related Art

Mobile communication systems have been developed to allow users to enjoy voice service regardless of location. With the rapid progress of communication technologies, the mobile communication systems have now evolved into advanced systems capable of data transmission to meet various users' demands. The advent of the advanced systems capable of data transmission enables transmission of various kinds of data. For example, the advanced systems can support Short Message Service (SMS), Internet service, moving image service, broadcasting service, and so on.

For data service, the mobile communication systems aim at transmitting a larger amount of data at a higher rate. In particular, unicast service such as broadcasting service is required to efficiently use the limited resources, because it must provide various broadcasting contents to a plurality of users. To meet the requirement, many attempts are being made to use Orthogonal Frequency Division Multiplexing (OFDM) rather than the conventional Code Division Multiple Access (CDMA) in providing broadcasting service.

In addition, safe data transmission is most important for the data service. To this end, the mobile communication system transmits data using a particular method, for example, a turbo coding method. Such a data transmission method generally makes use of Hybrid Automatic Repeat reQuest (H-ARQ). In H-ARQ, when a transmitter transmits data, a receiver receives and decodes the data. If the decoding result is bad, that is, if a CRC check result is erroneous, the receiver sends a retransmission request to the transmitter. In response to the retransmission request, the transmitter transmits the transmitted data without modification or modifies the data before transmission. Such a scheme is commonly used in the mobile communication.

However, the foregoing broadcasting service is a real-time unicast service. Therefore, in broadcasting service, the receiver cannot transmit a retransmission request to the transmitter, even though there is an error in the data received from the transmitter. This is because the broadcasting service must allocate different channel resources to a plurality of mobile terminals for data transmission. In other words, the broadcasting service requires more reliable data transmission compared with other services. However, the retransmission of high-speed data causes a decrease in transmission efficiency not only for the broadcasting service but also for other data services.

A detailed description will now be made of a method for transmitting data in a conventional mobile communication system.

FIG. 1 is a conceptual diagram illustrating a method for configuring a coded transmission symbol by coding and interleaving transmission information in a CDMA mobile communication system. With reference to FIG. 1, a description will now be made of a method for configuring a coded transmission symbol by coding and interleaving transmission information in a CDMA mobile communication system.

Transmission information is input to a turbo encoder 100. The turbo encoder 100 encodes the input information at a predetermined coding rate, and uses a coding rate R=1/5 in a CDMA system. In the encoding process, constituent encoders included in the turbo encoder 100 generate parity information pairs using the transmission information, and use it as a redundancy. That is, the turbo encoder 100 outputs coded information U 111, which includes systematic bits that are output without being processed, a first parity symbol pair V0/V0' 112, and a second parity symbol pair V1/V1' 113. In other words, the turbo encoder 100 receives one bit and outputs one systematic symbol and four redundancy symbols, satisfying the coding rate R=1/5. The parity symbol pairs 112 and 113 are double in size compared to the coded systematic symbols U 111. The systematic symbols U 111 are input to a first block interleaver 121, the first parity symbol pair 112 is input to a second block interleaver 122, and the second parity symbol pair 113 is input to a third block interleaver 123. Because the symbols input to the interleavers are different in size, the second interleaver 122 and the third interleaver 123 are double in size compared to the first interleaver 121.

The interleavers 121, 122 and 123 interleave their input symbols, and output the interleaved symbols to a serial combiner 130. The serial combiner 130 serially combines the output symbols of the block interleavers 121, 122 and 123, generating symbols 131, 132 and 133.

The symbols generated by serial-combining (or concatenating) the independently interleaved symbols are divided into an initial transmission subpacket (or first transmission subpacket) 141, a primary retransmission subpacket (or second transmission subpacket) 142, and a secondary retransmission subpacket (or third transmission subpacket) 143 according to transmission time slot and slot size, and they are used for initial transmission, primary retransmission and secondary retransmission, respectively. The subpacket transmitted at initial transmission includes the coded interleaved symbols U 131 and a part of the coded interleaved first parity symbol pair V0/V0' 132. Therefore, when the interleaving is disregarded and only the types of transmission symbols are considered, coded systematic symbols 131 and a part of the first parity symbol pair 132 constituting a redundancy are transmitted during the initial transmission. A part of the first parity symbol pair 132 constituting the redundancy is transmitted during the primary retransmission, and the remaining part of the first parity symbol pair 132 and a part of the second parity symbol pair 133, both constituting the redundancy, are transmitted during the secondary retransmission.

A description will now be made of an interleaving process.

FIGS. 2A through 2C are diagrams illustrating interleaving processes performed in the conventional CDMA system. The interleaving processes performed in the conventional CDMA system will now be described with reference to FIGS. 2A through 2C.

FIG. 2A is a diagram illustrating the input order of data being input to a block interleaver. As illustrated in FIG. 2A, if the total size of input coded symbols to be interleaved is determined, the interleavers determine a size of their input symbols using Equation (1) below to receive the input symbols.

$$\text{Total Size of Coded Symbols} = R \times 2^M \quad (1)$$

In Equation (1), a horizontal size of the block is denoted by $2^M$ and a vertical size of the block is denoted by R. As shown in Equation (1), the horizontal size is fixed to an exponential power of 2 and a value of R is determined such that the exponential power of 2 should be maximized.

For example, if a size N of the coded systematic symbols U 111 is 3072, the maximum value among the values expressed with an exponential power of 2 is 210. Therefore, a value of the R becomes 3 (R=3). That is, if a size of the input symbols is 3072 in accordance with Equation (1), the first block interleaver 121 has a size of 3×210.

Because the first parity symbol pair 112 and the second parity symbol pair 113 output from the turbo encoder 100 are double in size compared to the coded systematic symbols U 111, a size of the second block interleaver 122 and the third block interleaver 123 is expressed as 3×211, taking Equation (1) into consideration. That is, the size is determined such that R=3 and M=11.

For this size, the input order is determined as shown in FIG. 2A. More specifically, when the block is divided into rows and columns, the number of rows is R and the number of columns is $2^M$. Therefore, the interleaver inputs coded symbols to a first row 211 among the R rows in a left-to-right direction, and after fully filling the first row 211 with the coded symbols, inputs coded symbols to the next row 212 in the left-to-right direction. This process is repeated until all of the R rows are filled with the coded symbols.

After filling all of the R rows with input symbols in this manner, the block interleaver performs permutation of the columns on a bit reverse order (BRO) basis. This will be described with reference to FIG. 2B. FIG. 2B is a diagram illustrating a process of determining column positions on a BRO basis in a block interleaver.

The BRO interleaving process includes:

a) converting a decimal number indicating the order of a column into an M-digit binary number;

b) BRO-ordering the binary number;

c) re-converting the BRO-ordered binary number into a decimal number; and d) shifting all symbols in the corresponding column to a column indicated by the decimal number.

A description will now be made of an example of the BRO interleaving process. Assuming that M=11, if a first column is a $3^{rd}$ column, the order of the first column can be expressed with a binary number '00000000011'. If the binary number '00000000011' is subject to BRO ordering, the BRO-ordered binary number becomes '11000000000'. If the BRO-ordered binary number '11000000000' is re-converted into a decimal number, the decimal number becomes 1536. As a result, all symbols in the $3^{rd}$ column are shifted to the $1536^{th}$ column. On the contrary, the $1536^{th}$ column is shifted to the $3^{rd}$ column. This process, as shown in FIG. 2B, is expressed such that BRO(1)=$2^M/2$ and BRO(1)=($2^M/4$), . . . .

After performing column permutation on a BRO basis, the block interleaver outputs the corresponding symbols. With reference to FIG. 2C, a description will now be made of the output order of the BRO-ordered symbols. FIG. 2C is a diagram illustrating an output (reading) order of symbols in a block interleaver after BRO-based column permutation.

As illustrated in FIG. 2C, symbols are output column by column. That is, although the symbols are written (stored) row by row, the symbols are read (output) column by column. When the columns are designated as $0^{th}$ column, $1^{st}$ column, $2^{nd}$ column, . . . in the left-to-right direction, symbols are output from the top to the bottom of the $0^{th}$ column. That is, the data is output in the order of columns denoted by reference numerals 220, 221, 222, 223, . . . , 224, 225.

The symbols generated by serial-combining the coded interleaved symbols are modulated according to a predetermined modulation method before being transmitted. The modulation method may include Quadrature Phase Shift Keying (QPSK), 8-ary Phase Shift Keying (8PSK) and 16-ary Quadrature Amplitude Modulation (16QAM). The modulation symbols differ from each other in symbol reliability according to modulation method used for the modulation. Actually, in 8PSK or 16QAM, modulated bits are different from each other in reliability. For example, if 3 interleaved bits 'b0,b1,b2' are mapped to one 8PSK symbol before being transmitted, the symbols 'b0,b1,b2' are not equal to each other in reliability. That is, the symbol b2 is lower in reliability than the symbols b0 and b1. In addition, if 4 interleaved bits 'b0,b1,b2,b3' are mapped to one 16QAM symbol before being transmitted, the symbols b1 and b3 are lower in reliability than the symbols b0 and b2. The reliability is determined depending on a mapping method. Although the low-reliability bit positions can be improved by modifying the mapping method, the modification of the mapping method may cause a decrease in reliability of other symbol positions. That is, there are always some mapped bits whose transmission reliability is lower than that of the other bits.

In this case, if the bits interleaved by the conventional interleaver are mapped to a modulation symbol, adjacent bits might be mapped to the positions having the same reliability. As a result, the bits may be mapped to high-reliability positions in a particular interval, and to low-reliability positions in another interval, deteriorating channel coding performance. Therefore, during high-speed data transmission, a retransmission request may be frequently issued due to the low-reliability symbols. The service that cannot support retransmission, such as broadcasting service, suffers QoS deterioration. In addition, a possible issuance of the retransmission request may result in a service delay and a reduction in channel resource efficiency.

Accordingly, there is a need for an improved apparatus and method for interleaving channels in a mobile communication system.

SUMMARY OF THE INVENTION

It is, therefore, an object of embodiments of the present invention to provide an apparatus and method for performing interleaving taking a modulation scheme into account.

It is another object of embodiments of the present invention to provide a method capable of improving average reliability of symbols.

It is further another object of embodiments of the present invention to provide an interleaving apparatus and method capable of improving channel coding performance taking into account the possibility that modulated bits can be mapped to bit positions having different reliabilities.

It is yet another object of embodiments of the present invention to provide an interleaving apparatus and method capable of reducing retransmission request by safely transmitting symbols.

It is still another object of embodiments of the present invention to provide an interleaving apparatus and method capable of improving quality-of-service (QoS) by improving reliability of symbols.

According to one aspect of the present invention, a method for interleaving symbols coded by a turbo encoder is provided in a communication system that uses the turbo encoder for encoding transmission information into coded systematic symbols and at least one parity symbol pair, and maps the coded symbols using a second or higher modulation order before transmission. The method comprises defining, on a three-dimensional plane of x, y and z-axes, the modulation order as a size R of the z-axis, determining a size of the x-axis taking the size R of the z-axis into account so that a physical packet size of the transmission information has a maximum value of $2^M$, and determining a size K of the y-axis so that the size K satisfies the physical packet size. The coded symbols are sequentially received, and the received coded symbols are three-dimensionally stored according to the sizes of the x, y and z-axes. The storing step comprises selecting an x-y plane in which an initial symbol is stored; sequentially storing the coded symbols in an x-z plane on the three-dimensional plane in a direction of the y-axis from a particular position in which the initial symbol is to be stored; after completion of storing the coded symbols in the y-axis direction, shifting in a direction of the x-axis from the particular position and then repeating the sequential storing step; and after completion of storing the coded symbols in the selected x-y plane, selecting a next x-y plane in a direction of the z-axis and repeating the sequential storing and shifting steps; after completion of storing the coded symbols received from the turbo encoder, independently performing cyclic shifting separately on the coded systematic symbols and the parity symbol pair for each x-z plane. The cyclic shifting step comprises cyclic-shifting the coded systematic symbols according to a size of the coded symbols to be transmitted and the number of transmissions using an equation of $(K \times c+k) \bmod R$; and cyclic-shifting redundancy symbols constituting the remaining size of the coded symbols to be transmitted, using an equation of $\text{floor}\{(K \times c+k)/D\} \bmod R$; wherein if a ratio of the number of the redundancy symbols constituting the remaining size of the coded symbols to be transmitted to the number of symbols constituting the parity symbol pair satisfies $1/n$, where $n=1, 2, 4, 8, 16, \ldots$, a value of D is set to $K \times n$, and if the ratio has a value of $m/p$, a value of $1/n$ is set to a value most approximating the value of $m/p$, and the value of D is set to a value obtained by multiplying the value n by K; after completion of the independent cyclic shifting, dividing y-z planes into columns and reordering the columns by bit reverse ordering (BRO); and selecting an x-z plane, from which the symbols reordered in the x, y and z axes are to be output, according to the number of the coded symbols to be transmitted, determining an output order of y-z columns on the selected x-z plane, and sequentially outputting symbols in each of the determined columns in a direction of the z-axis.

According to another aspect of the present invention, there is provided an apparatus for interleaving symbols coded by a turbo encoder in a communication system that uses the turbo encoder for encoding transmission information into coded systematic symbols and at least one parity symbol pair, and maps the coded symbols using a second or higher modulation order before transmission. The apparatus includes an interleaver controller for receiving information on a size of a physical packet to be transmitted, the number of transmission slots and a modulation order, defining, on a three-dimensional plane of x, y and z-axes, the modulation order as a size R of the z-axis, determining a size of the x-axis taking the size R of the z-axis into account so that a physical packet size of the transmission information has a maximum value of $2^M$, determining a size K of the y-axis so that the size K satisfies the physical packet size, storing the coded symbols in a three-dimensional interleaver, and controlling an interleaving and outputting operation. A channel interleaver sequentially receives the coded symbols, selecting, under the control of the interleaver controller, an x-y plane in which an initial symbol is to be stored according to sizes of the x, y and z-axes. The channel interleaver also sequentially stores the received symbols in an x-z plane on the three-dimensional plane in a direction of the y-axis from a particular position in which the initial symbol is to be stored. After completion of storing the coded symbols in the y-axis direction, the channel interleaver shifts in a direction of the x-axis from the particular position and repeatedly sequentially stores the received symbols. After completion of storing the coded symbols in the selected x-y plane, the channel interleaver selects a next x-y plane in a direction of the z-axis and stores all of the received symbols in the three-dimensional plane through repetition of the above process. The channel interleaver also distinguishes the coded systematic symbols and the parity symbol pair for each x-z plane, cyclic-shifts the coded systematic symbols according to a size of the coded symbols to be transmitted and the number of transmissions using an equation of $(K \times c+k) \bmod R$; determines a cyclic shift pattern using an equation of $\text{floor}\{(K \times c+k)/D\} \bmod R$ and sets a value of D to $K \times n$ if a ratio of the number of the redundancy symbols constituting the remaining size of the coded symbols to be transmitted to the number of symbols constituting the parity symbol pair satisfies $1/n$, where $n=1, 2, 4, 8, 16, \ldots$. If the ratio has a value of $m/p$, the channel interleaver sets a value of $1/n$ to a value most approximating the value of $m/p$ and setting the value of D to a value obtained by multiplying the value n by K. After completion of the independent cyclic shifting, the channel interleaver divides y-z planes into columns and reorders the columns by bit reverse ordering (BRO), selecting an x-z plane, from which the symbols reordered in the x, y and z axes are to be output, according to the number of the coded symbols to be transmitted. The channel interleaver determines an output order of y-z columns on the selected x-z plane, and sequentially outputs symbols in each of the determined columns in a direction of the z-axis.

According to another aspect of the present invention, a method for interleaving symbols coded by a turbo encoder in a communication system that uses the turbo encoder for encoding transmission information into coded systematic symbols and at least one parity symbol pair, and maps the coded symbols using a second or higher modulation order before transmission is provided. The method comprises cyclic-shifting the systematic symbols among the symbols coded by the turbo encoder, using an equation of $(K \times c+k) \bmod R$; and cyclic-shifting redundancy symbols constituting the remaining size of the coded symbols to be transmitted, using an equation of $\text{floor}\{(K \times c+k)/D\} \bmod R$;

wherein K denotes a height of symbols stored on a three-dimensional plane, c denotes a column index, k denotes a plane index having a value of $0, 1, \ldots$, R denotes a modulation order, mod denotes a modulo operation, floor x denotes a function indicating a largest integer not greater than x, and D denotes a parameter determined depending on the number of symbols to be transmitted.

According to yet another aspect of the present invention, there is provided an apparatus for interleaving symbols coded by a turbo encoder in a communication system that uses the turbo encoder for encoding transmission information into coded systematic symbols and at least one parity symbol pair, and maps the coded symbols using a second or higher modulation order before transmission. The apparatus comprises an interleaver controller for performing a control operation of cyclic-shifting the systematic symbols among the symbols coded by the turbo encoder depending on a size of a physical packet to be transmitted, the number of transmission slots, and the modulation order, using an equation of (K×c+k)mod R, and cyclic-shifting redundancy symbols constituting the remaining size of the coded symbols to be transmitted, using an equation of floor{(K×c+k)/D}mod R; and an interleaver for cyclic-shifting input symbols under the control of the interleaver controller;

wherein K denotes a height of symbols stored on a three-dimensional plane, c denotes a column index, k denotes a plane index having a value of 0, 1, ..., R denotes a modulation order, mod denotes a modulo operation, floor x denotes a function indicating a largest integer not greater than x, and D denotes a parameter determined depending on the number of symbols to be transmitted.

BRIEF DESCRIPTION OF THE DRAWINGS

The above and other objects, features and advantages of exemplary embodiments of the present invention will become more apparent from the following detailed description when taken in conjunction with the accompanying drawings in which.

Throughout the drawings, like reference numbers will be understood to refer to like elements, features and structures.

DETAILED DESCRIPTION OF EXEMPLARY EMBODIMENTS

An exemplary embodiment of the present invention will now be described in detail with reference to the annexed drawings. In the following description, a detailed description of known functions and configurations incorporated herein has been omitted for clarity and conciseness.

Figure 3:
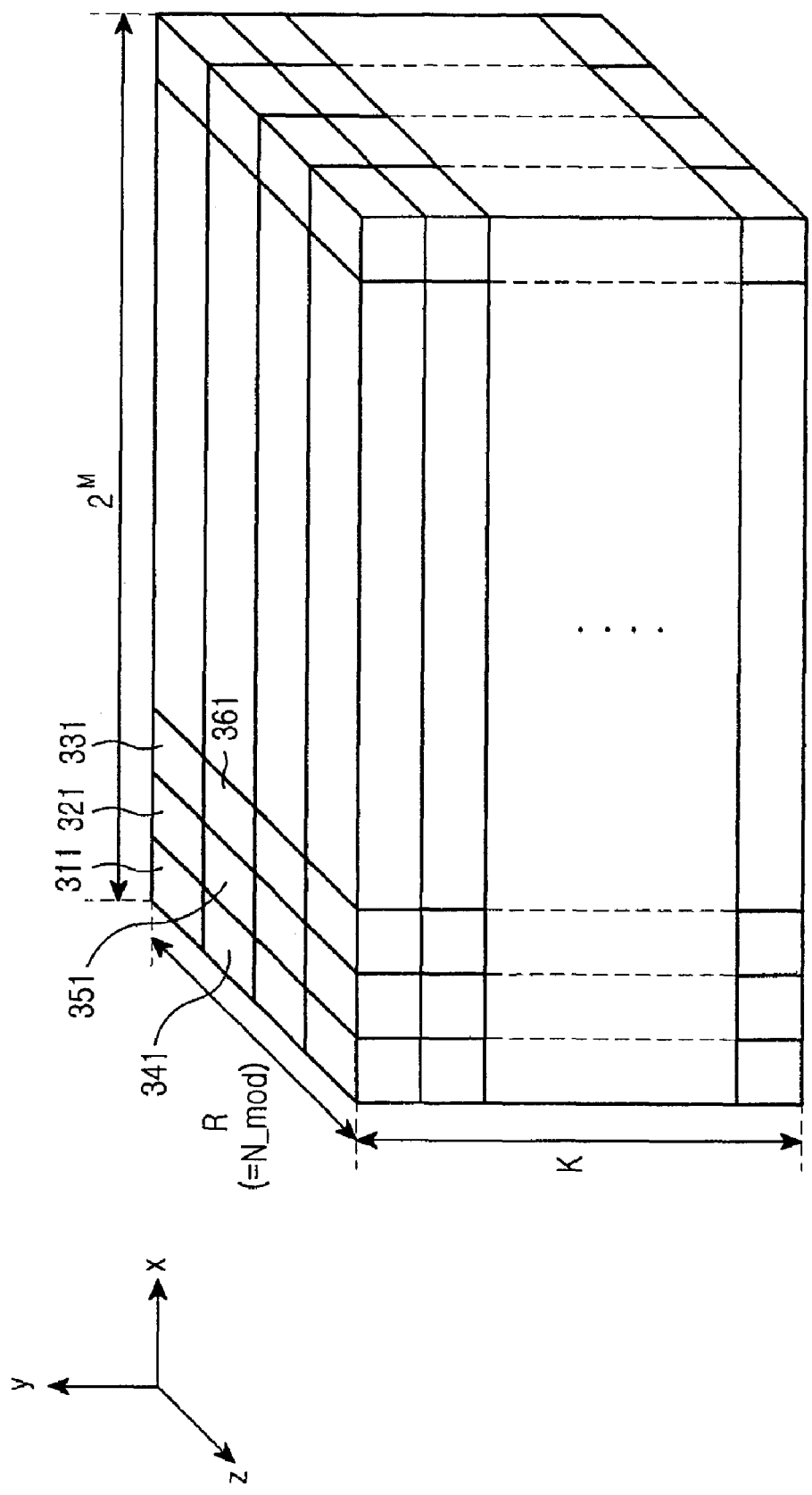
FIG. 3 is a diagram illustrating an exemplary structure for storing coded symbols, given for a description of three-dimensional interleaving according to an exemplary embodiment of the present invention.

FIG. 3 is a diagram illustrating an exemplary structure for storing coded symbols, given for a description of three-dimensional interleaving according to an embodiment of the present invention. With reference to FIG. 3, a description will now be made of a method for configuring coded symbols for three-dimensional interleaving according to an exemplary embodiment of the present invention.

In the three-dimensional interleaving method according to an exemplary embodiment of the present invention, a size of the coded symbols depends on sizes of an x-axis, y-axis and z-axis. Therefore, the total size of the coded symbols to be interleaved is expressed as $$\text{Total Size of Coded symbols} = 2^M \times R \times K \tag{2}$$

In Equation (2), a horizontal size (the number of columns, or the number of symbols constituting the x-axis) is denoted by $2^M$ and a vertical size (the number of rows, or the number of symbols constituting the z-axis) is denoted by R. In Equation (2), a value of R is set to a modulation order, compared with the conventional technology in which a value of the R is determined such that an exponential power of 2 should be maximized for expression of the size of the coded symbols. Therefore, R=3 for 8PSK, and R=4 for 16QAM.

If the R is set to a modulation order, a height of a three-dimensional block is determined such that it is matched to a size of the symbols to be interleaved. That is, the number of columns is fixed to $2^M$, and the total number of symbols can be matched to the size of the symbols to be interleaved, by adjusting a value of K. For example, assuming that 16QAM is used for a block size=3072, the parameters can be set such that R=4, K=3 and M=8. In this case, in the conventional two-dimensional block interleaver, the number of columns should be 768 (=3072/4) for R=4. However, 768 cannot be expressed as $2^M$.

In FIG. 3, reference numerals 311, 321, 331, 341, 351 and 361 indicate the positions where symbols to be interleaved are stored, or the symbols to be interleaved. That is, each of hexahedrons in inner blocks constituting Equation (2) becomes one symbol storage position or one symbol. With reference to FIGS. 4A through 4D, a description will now be made of a process in which symbols are stored and interleaved for three-dimensional interleaving.

Figure 4A:
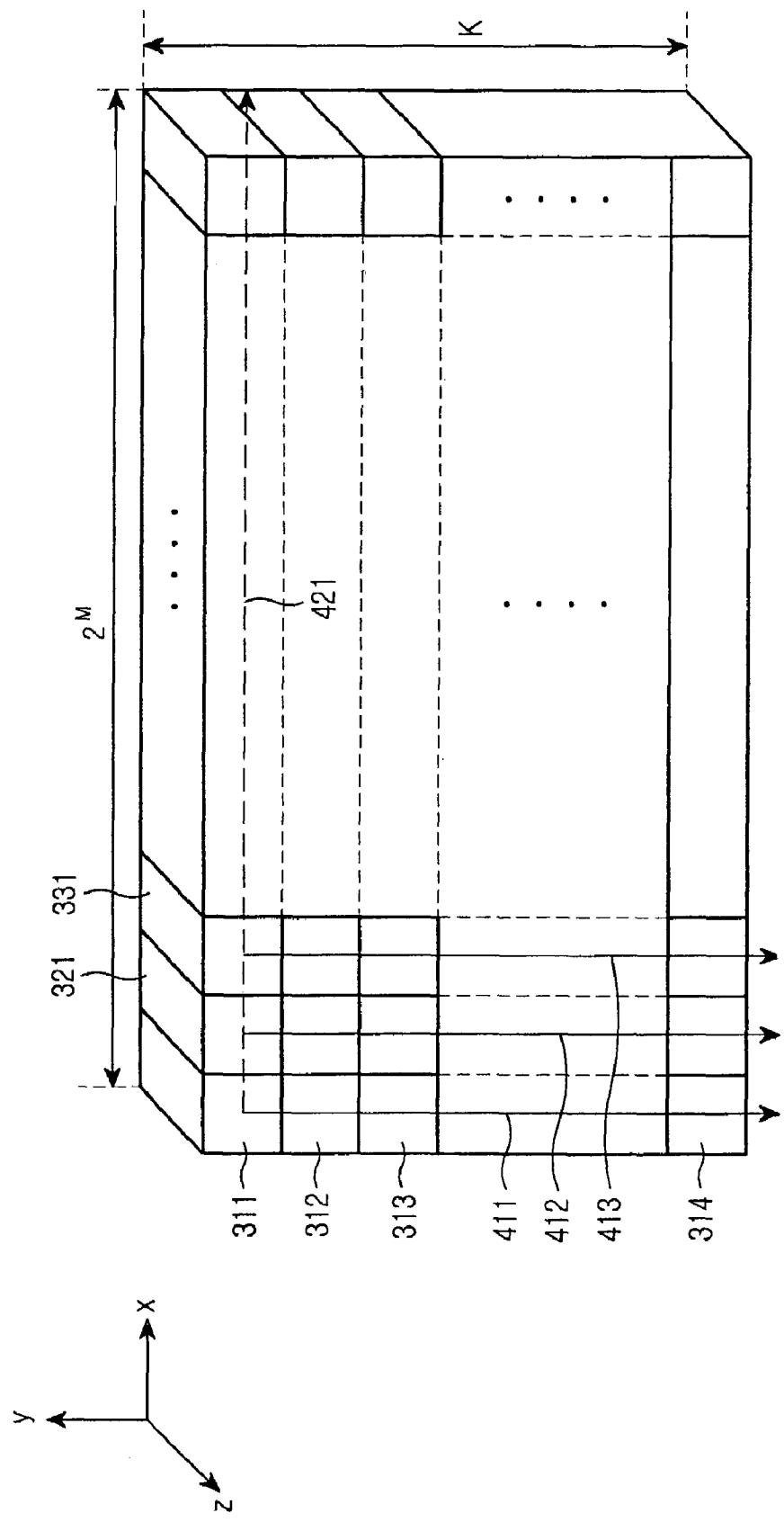
FIG. 4A is a diagram illustrating a process of storing symbols for three-dimensional interleaving according to an exemplary embodiment of the present invention.

FIG. 4A is a diagram illustrating a process of storing symbols for three-dimensional interleaving according to an exemplary embodiment of the present invention. With reference to FIG. 4A, a detailed description will now be made of a process of storing symbols for three-dimensional interleaving according to an embodiment of the present invention.

FIG. 4A illustrates a first row on the z-axis selected from all blocks shown in FIG. 3. The first row is shown along with the y-axis in the three-dimensional block. In FIG. 4A, symbols are input (written) in the top-to-bottom direction of the y-axis in the first row on the z-axis. That is, the symbols are stored in such a manner that a first symbol is stored in a position 311, the next symbols is stored in a position 312, and the next symbol is stored in a position 313. In this way, the final symbol on the y-axis is stored in a position 314. This symbol storage order is denoted by an arrow 411. After the symbols are stored in the direction of the arrow 411, a symbol is stored in the next position 321. Similarly, the next symbols are stored in the direction of an arrow 412. After all of the symbols are stored in the direction of the arrow 412, symbols are stored in the direction of an arrow 413 from the next position 331.

A description will now be made of an x-z plane given when the symbols are stored in the directions 411, 412 and 413. A symbol storage direction is shown by a bold dotted line 421. Because the height is K, if a column is selected, K symbols are written in the column in the top-to-bottom direction of the y-axis. This process is repeated $2^M$ times. After symbols are completely stored in one of x-y planes in the foregoing manner, symbols are stored in the next x-y plane. Describing the order of x-y planes with reference to FIG. 3, x-y planes 311, 321 and 331 are first selected, and x-y planes 341, 351 and 361 are selected next. In this manner, the data is stored until the three-dimensional block is fully filled with data.

Figure 4B:
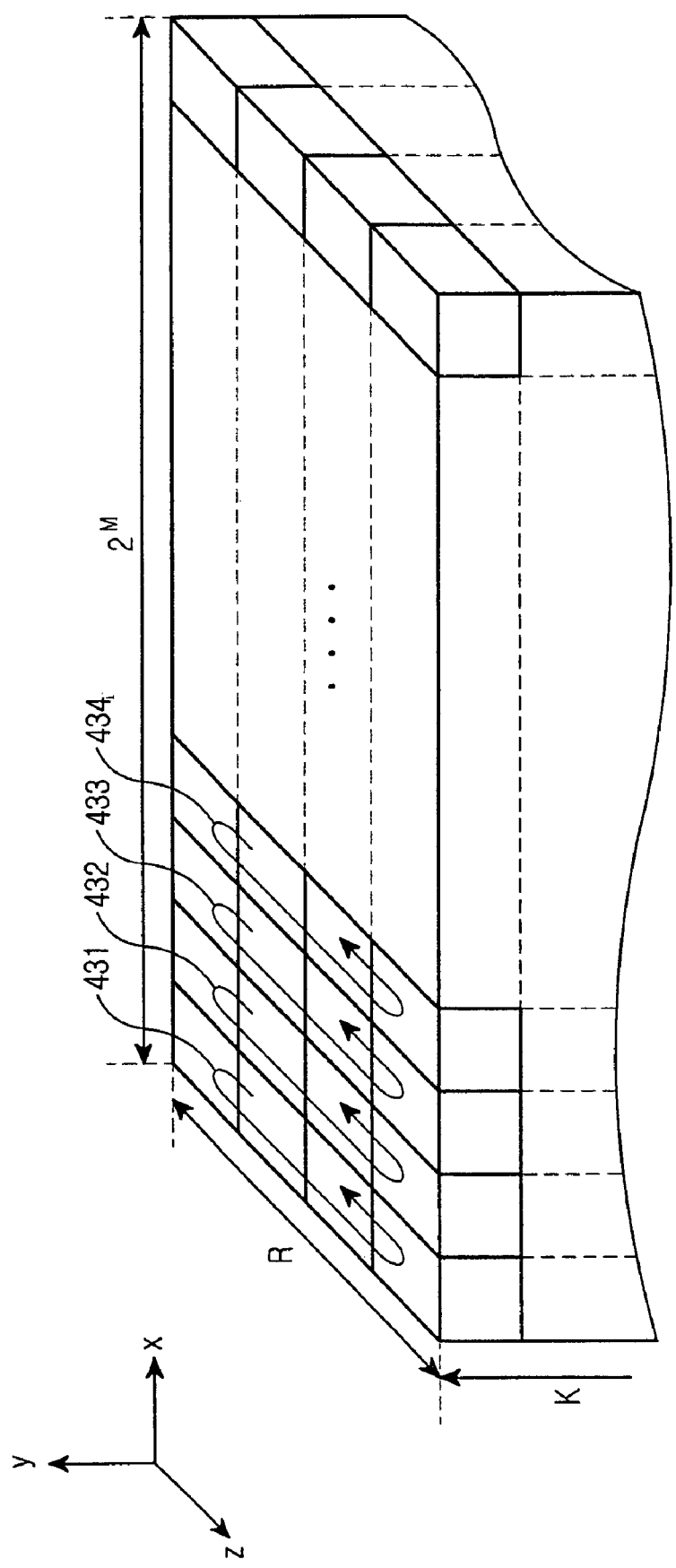
FIG. 4B is a diagram for a description of a method for cyclic-shifting symbols for three-dimensional interleaving according to an exemplary embodiment of the present invention.

Thereafter, the three-dimensional symbols are subject to a cyclic shift operation. FIG. 4B is a diagram for a description of a method for cyclic-shifting symbols for three-dimensional interleaving according to an exemplary embodiment of the present invention. With reference to FIG. 4B, a description will now be made of a cyclic shift operation according to an embodiment of the present invention.

The reason for using cyclic shifting in an exemplary embodiment of the present invention will be described in detail after a description of symbol outputting. A description will first be made of an operation of cyclic shifting of symbols. The cyclic shift operation, as shown in FIG. 4B, determines the order or columns and then performs cyclic shifting on each of the columns. An exemplary embodiment of the present invention achieves cyclic shifting by performing a modulo-R operation. That is, for R=4, the order of $0^{th}$ to $3^{rd}$ columns is subject to continuous change. Further, in an exemplary embodiment of the present invention, coded systematic symbols 111 are different from a first parity symbol pair 112 and a second parity symbol pair 113 in terms of a cyclic shift pattern. A cyclic shift pattern of the coded systematic symbols 111 is defined as Equation (3), and a cyclic shift pattern of the first parity symbol pair 112 and the second parity symbol pair 113 is defined as Equation (4).

Cyclic Shift Pattern of Coded Systematic Symbols=
$(K \times c + k) \mod R$     (3)

Cyclic Shift Pattern of Parity Symbols=floor$\{(K \times c + k)/D\} \mod R$     (4)

In Equation (3) and Equation (4), K denotes a height of the three-dimensional block and R denotes a modulation order. In addition, c denotes a column index, that is, an order of a corresponding column, and k denotes an index corresponding to an x-z plane on the y-axis. Therefore, a value of D must be determined in order to determine a cyclic shift pattern for the parity symbol pairs. That is, D becomes a parameter used for determining a cyclic shift pattern. A method for performing cyclic shift in accordance with Equation (3) or Equation (4) performs z-axis cyclic shift in the manner shown by reference numerals 431 through 434. That is, for a cyclic shift value=0, cyclic shift is not performed. For a cyclic shift value=1, symbols are down shifted one by one and the bottom symbol is shifted to the top. For a cyclic shift value=2, the top symbol is down shifted to a second symbol position, a third symbol is shifted to a first symbol position, and a fourth symbol is shifted to a second symbol position. It should be noted that this symbol shift operation is performed only in a corresponding x-z plane on the y-axis and a symbol shift operation in other x-z planes is performed in accordance with Equation (3) or Equation (4). Cyclic shift is accomplished according to the foregoing method. The reason for performing such a cyclic shift operation will be described in detail after a description of a method for outputting modulation symbols.

Figure 4C:
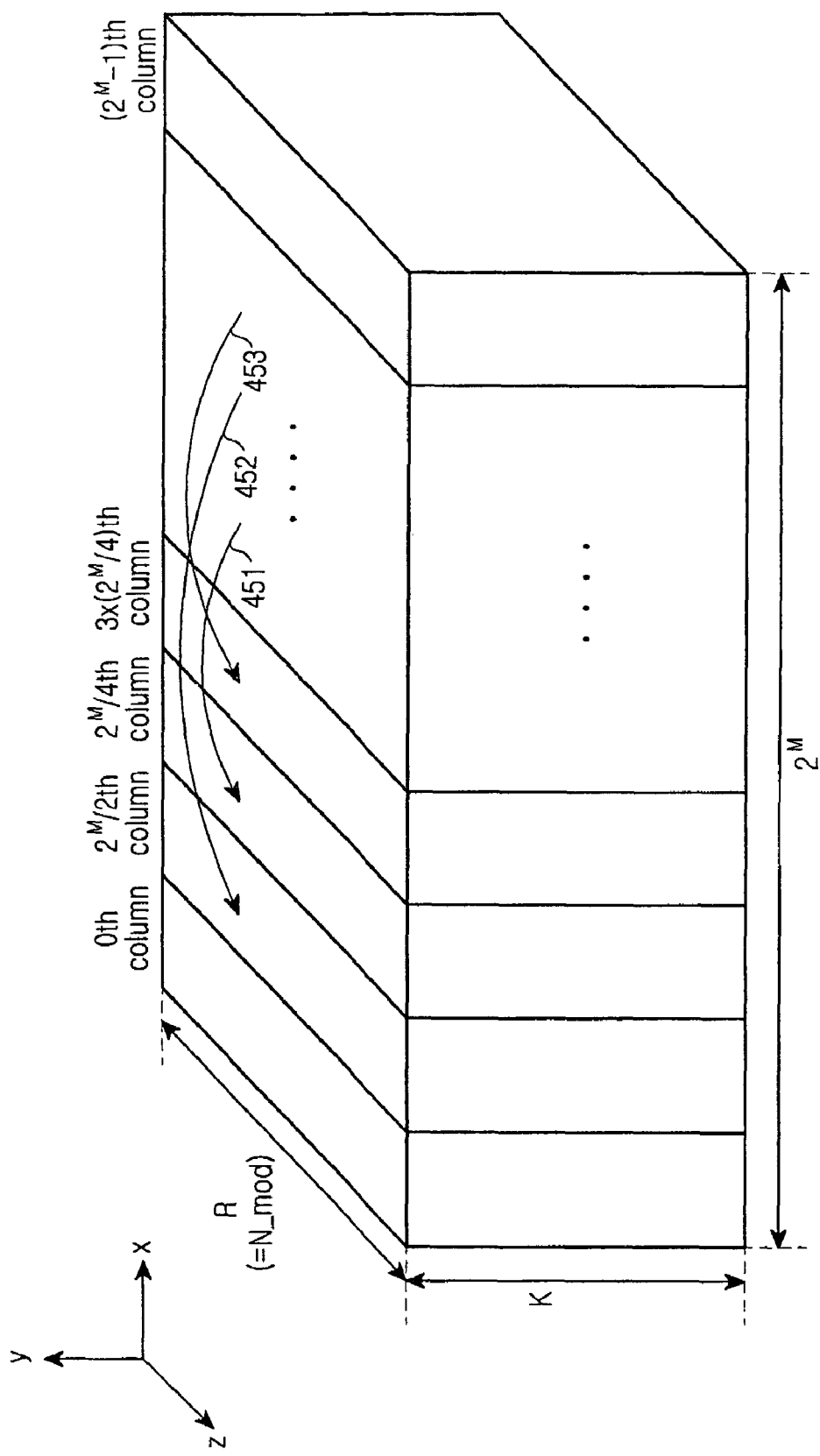
FIG. 4C is a diagram illustrating a method for BRO-shifting three-dimensional interleaving symbols according to an exemplary embodiment of the present invention.

Next, the cyclic-shifted symbols are subject to a BRO shift operation. FIG. 4C is a diagram illustrating a method for BRO-shifting three-dimensional interleaving symbols according to an embodiment of the present invention. With reference to FIG. 4C, a description will now be made of a method for BRO-shifting three-dimensional interleaving symbols according to an embodiment of the present invention.

As described above, the BRO interleaving process includes:

a) converting a decimal number indicating the order of a column into an M-digit binary number;

b) BRO-ordering the binary number;

c) re-converting the BRO-ordered binary number into a decimal number; and d) shifting all symbols in the corresponding column to a column indicated by the decimal number.

In step a), the order of columns is determined as shown in FIG. 4C. That is, when the three-dimensional block is divided into y-z planes, a set of symbols constituting each of the planes becomes one column. In step a), a decimal number indicating the order of a column is converted into a binary number. In step b), the binary number is BRO-ordered. In step c), the BRO-ordered binary number is re-converted into a decimal number. In step d), all symbols in the corresponding column are shifted to a column indicated by the decimal number. In FIG. 4C, arrows 451, 452 and 453 are provided to describe how to shift (permute) the columns.

Figure 4D:
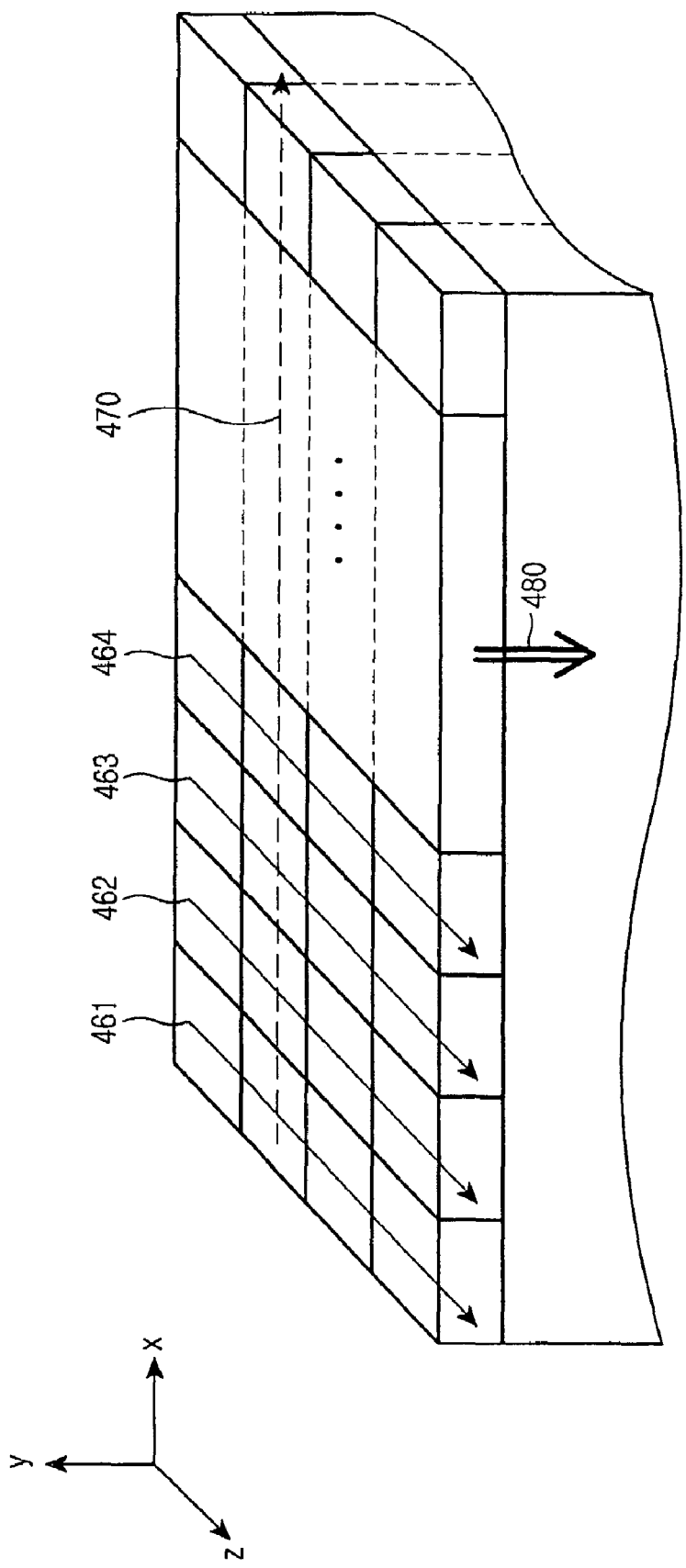
FIG. 4D is a diagram illustrating an output order of three-dimensional interleaving symbols according to an exemplary embodiment of the present invention.

After performing the column permutation on a BRO basis, the block interleaver outputs the corresponding symbols. With reference to FIG. 4D, a description will now be made of the output order of the BRO-ordered symbols. FIG. 4D is a diagram illustrating an output order of three-dimensional interleaving symbols according to an embodiment of the present invention.

Referring to FIG. 4D, the symbol output process includes:

1) selecting the uppermost x-z plane among non-output x-z planes;

2) sequentially outputting columns on the selected plane from the first column;

3) outputting symbols in a corresponding column from the top row; and 4) selecting the next uppermost x-z plane after outputting all of the symbols on the selected x-z plane.

Arrows 461 through 464 in FIG. 4D indicate step 3), an arrow 470 indicates step 2), and an arrow 480 indicates step 4).

A detailed description will now be made of the reason for performing cyclic shift when the symbols are output in the above manner, and of an operation of performing cyclic shifting. As described above, in the three-dimensional interleaving block, a horizontal size (the number of rows) denoted by the z-axis is set to a modulation order, such that columns output from the interleaver are mapped to one modulation symbol. A description thereof will be given for 16QAM, by way of example. Because 16QAM has a fourth modulation order, R has a value of 4 (R=4). Therefore, four symbols located in one column output from the interleaver are expressed with four individual bits s0, s1, s2 and s3. The four bits s0, s1, s2 and s3 are mapped to one 16QAM modulation symbol.

As described above, in the 16QAM modulation symbol, s1 and s3 are located in high-reliability positions and s0 and s2 are located in low-reliability positions. Therefore, if an interleaver is implemented without the cyclic shift process, a first row where s0 is located and a third row where s2 is located are always mapped to low-reliability positions in the modulation symbol. Because coded symbols are input to the interleaver from the topmost x-z plane, the symbols in the same position on the y-axis are always mapped to the low-reliability positions. On the contrary, second and fourth columns where s1 and s3 are located, respectively, always have high reliability.

Therefore, it is contrary to the requirements that symbol reliabilities should be uniformly distributed to provide high performance because of the characteristic of channel coding performed after interleaving. Thus, an exemplary embodiment of the present invention can solve such problems by adopting a cyclic shifting method.

A detailed description will now be made of the cyclic shift process according to an exemplary embodiment of the present invention. The cyclic shift process according to an exemplary embodiment of the present invention cyclic-shifts positions of four different coded symbols located in one column. As described above, for 16QAM, coded symbols s0, s1, s2 and s3 are mapped to one modulation symbol, and they are all located in the same column. Therefore, if a cyclic shift value, that is, the number of cyclic shifts, is 0 for the coded symbols, the position or output order of the cyclic-shifted coded symbols is maintained as s0, s1, s2 and s3. If the cyclic shift value, that is, the number of cyclic shifts, is 1, the position or output order of the cyclic-shifted coded symbols becomes s3, s0, s1 and s2. That is, s3 is located in a first row and s2 is located in a fourth row. Similarly, if the cyclic shift value is 2, the position or output order of the cyclic-shifted coded symbols becomes s2, s3, s0 and s1, and if the cyclic shift value is 3, the position or output order of the cyclic-shifted coded symbols becomes s1, s2, s3 and s0.

By performing cyclic shifting on the columns different times in this manner, the bits located in the same column are shifted to anther column. This means that the coded symbols are mapped to the positions having different reliabilities in the modulation symbol.

As described with reference to Equation (3), a modulo-R operation is performed in interleaving the coded systematic symbols 111, because for R=4, performing cyclic shifting four times is equal to performing cyclic shifting one time in terms of the output order. For the same reason, the modulo-R operation is performed even in Equation (4). That is, in interleaving the coded systematic symbols 111, cyclic shifting is performed according to a level index on the y-axis and a column index on the x-axis in accordance with Equation (3).

Next, a description will be made of a method for cyclic-shifting the parity symbol pairs 112 and 113 corresponding to the redundancy. For the parity symbol pairs 112 and 113, a floor function is used with the use of a parameter D which is not used in Equation (3). The floor function is defined as floor x=largest integer not greater than x (5)

The reason for using the floor function of Equation (5) is caused by a size of a transmission subpacket. This will be described with reference back to FIG. 1. That is, one subpacket transmitted for one slot includes symbols of different contents at initial transmission, primary retransmission and secondary retransmission. That is, a subpacket including all of coded systematic symbols 131 and a part of a first parity symbol pair 132 is transmitted during initial transmission. In other words, only a part of the redundancy part is transmitted. Because only a leading part of the interleaved redundancy is transmitted, it is equivalent to puncturing some symbols among consecutive symbols before transmission, in a deinterleaving process.

Therefore, if the number of cyclic shifts is sequentially set to 0, 1, 2, 3, 0, 1, 2, 3, . . . , symbols actually transmitted on the assumption that even bits were punctured include only $1^{st}$ symbol, $3^{rd}$ symbol, $5^{th}$ symbol, $7^{th}$ symbol, . . . . As a result, it is equivalent to setting the number of cyclic shifts to 1, 3, 1, 3, . . . . When adjacent bits are converted into a modulation symbol through cyclic shifting in this manner, the adjacent bits are mapped to the positions having the same reliability. As a result, the bits are continuously mapped to high-reliability positions in a particular interval and to low-reliability positions in another interval before being transmitted, thus deteriorating channel coding performance.

That is, when ½ of one parity symbol pair (½ of one redundancy block), is transmitted and the remaining ½ is punctured, the number of cyclic shifts can be set to 0, 0, 1, 1, 2, 2, 3, 3, . . . . If the number of cyclic shifts is set in this way, even though only the odd symbols are transmitted, the number of cyclic shifts for the symbols is set to 0, 1, 2, 3, . . . , allowing adjacent bits to have different reliabilities. Specifically, if an $i^{th}$ symbol is mapped to a high-reliability position, an $(i+1)^{th}$ symbol is mapped to a low-reliability position, guaranteeing uniform reliability distribution. Therefore, an exemplary embodiment of the present invention sets the number of cyclic shifts for each parity symbol pair in accordance with Equation (4) in order to meet the uniform reliability distribution requirement. Accordingly, a value of D can be determined depending on the transmitted amount of each parity symbol pair, and if ½ of the parity symbol pair is transmitted, the value of D is set to 2 (D=2). That is, in Equation (4), the number of cyclic shifts is dependent on a value of D.

Therefore, when ¼ of one parity symbol pair is transmitted and the remaining ¾ is punctured, the number of cyclic shifts can be set to 0, 0, 0, 0, 1, 1, 1, 1, 2, 2, 2, 2, 3, 3, 3, 3, . . . . As a result, even though every $4^{th}$ symbol is transmitted or only the odd symbols are transmitted, the number of cyclic shifts for each symbol becomes 0, 1, 2, 3, . . . , allowing adjacent symbols to have different reliabilities. In this case, a value of D is set to 4 (D=4).

A detailed description will now be made of a method for setting a value of D according to the transmitted amount of a redundancy, that, the transmitted amount of one parity symbol pair.

If 1/n of one parity symbol pair is transmitted and the remaining (n−1)/n is punctured, a value of D is set to K×n, where n=1, 2, 4, 8, 16, . . . .

However, one parity symbol pair cannot be fully transmitted by simply transmitting only 1/n of the parity symbol pair and puncturing the remaining (n−1)/n of the parity symbol pair. That is, for n>m, m/n of one parity symbol pair may be transmitted and the remaining (n−m)/n may be punctured. In this case, for example, 7/16 of one parity symbol pair may be transmitted and the remaining 9/16 may be punctured. Such an irregular transmission pattern makes it difficult to find a value of D used for determining a cyclic-shift pattern.

For the irregular transmission pattern, an exemplary embodiment of the present invention sets a value of D used for determining a cyclic shift pattern to K×n such that it is greater than a ratio of a transmitted part of one parity symbol pair, most approximating 1/n. That is, for 7/16, because the value most approximating 1/n is ½, a value of D used for transmitting ½ of one parity symbol pair is determined as a value of D used for transmitting 7/16 of one parity symbol pair. In this case, actually, for 7/16, a value of D becomes 2 (D=2). The reason for determining the D value in this manner is because it is preferable to select a value most approximating 1/n which is the most ideal type. In addition, 1/n must be greater than m/n because it can be assumed that the increased remaining part of the parity symbol pair is punctured.

Alternatively, however, it can be assumed that the decreased remaining part of the parity symbol pair is punctured. That is, it is also possible to select a value that is less than m/n and most approximates 1/n. It can be assumed that the punctured amount for this case is less than that for 1/n. In the foregoing example, if the transmission is assumed to be 7/16, a value that is less than 7/16 and most approximates 1/n, can become ¼. In this case, therefore, a value of D can be set to K×n=1×4=4. That is, it can be considered that ¼ of one parity symbol pair is transmitted and the remaining ¾ is punctured. In this case, it can be construed that the data, the larger amount of which is transmitted, is less punctured.

Alternatively, the two methods can be performed in parallel. That is, it is also possible to select a value of 1/n that most approximates m/n. In this case, if m/n>1/n, it is assumed that the number of punctured bits for m/n is less than the number of punctured bits for 1/n, and if m/n<1/n, it is assumed that the number of punctured bits for m/n is greater than the number of punctured bits for 1/n.

A description will now be made of a selected one of the foregoing methods, for convenience. It is assumed herein that when a part of one parity symbol pair is irregularly transmitted, that is, is not transmitted in the form of 1/n, a value of D is set to a value multiplied by K for 1/n that is greater than m/n and most approximates m/n, in determining a value of m/n.

Table 1 illustrates an interleaving rule based on data rates and packet sizes available in a High Rate Packet Data (HRPD) system, which is a high-speed packet data transmission system, for data transmission.

TABLE 1

|  | Physical packet size (U block size) | |
| --- | --- | --- |
|  | 2048 | 3072 |
| Transmit duration (slot) | 1 | 1 |
| Data rate | 1.2 Mbps | 1.8 Mbps |
| Modulation | 16 QAM | 16 QAM |
| Effective code rate | 0.53 | 0.8 |
| Transmitted Redundancy bit | 1792 (7/16 of V0/V0' block) | 768 (1/8 of V0/V0' block, 3/8 of 1$^{st}$ level of V0/V0' block) |
| R | 4 | 4 |
| M | 9 | 8 |
| K | 1 | 3 |
| D | 2 | 6 (or 4) |

As illustrated in Table 1, the interleaving parameters R, M, K and D according to an exemplary embodiment of the present invention are set depending on physical packet size. A description thereof will be made separately for each physical packet size.

For physical packet size=2048, the number of redundancy symbols transmitted at initial transmission is 1792. Because one parity symbol pair includes 2048×2=4096 symbols, a ratio of the redundancy symbols transmitted at initial transmission becomes 1792/4096=7/16. That is, only 7/16 of all redundancy symbols constituting one parity symbol pair are transmitted. Therefore, only the redundancy symbols with even column numbers of 0, 2, 4, 6, 8, 10, 12, 16, 18, . . . are transmitted, and every 8$^{th}$ even column is not transmitted. Such an irregular transmission pattern makes it difficult to find a value of D used for determining a cyclic shift pattern. Because the number of non-transmitted even columns is small, it is assumed herein that all of the even columns are transmitted. On this assumption, a value of D is set to 2 so that ½ of one parity symbol pair is transmitted and the remaining ½ is punctured.

Next, for physical packet size=3072, the number of redundancy symbols transmitted at initial transmission is 768. In this case, because one parity symbol pair includes 3072×2=6144 symbols, a ratio of the redundancy symbols transmitted at initial transmission becomes 768/6144=⅛. However, because the physical packet size 3072 cannot be expressed as $2^M$, a value of K is set to 3 so that it has three levels. That is, the three-dimensional block is configured to have three x-z planes on the y-axis. Therefore, each x-z plane constituting each level has 1024 symbols. In this case, the number of the redundancy symbols actually transmitted at initial transmission is calculated not from one parity symbol pair but from one level. As a result, the number of the redundancy symbols actually transmitted at initial transmission becomes 768/2048=⅜.

Therefore, column numbers of redundancy symbols actually transmitted taking interleaving into account include only even columns of 0, 2, 4, 8, 10, 12, 16, 18, . . . , and every 4$^{th}$ even column is not transmitted. Because the actually transmitted redundancy symbols show an irregular transmission pattern, a value of the parameter D used for determining a cyclic shift pattern is calculated in the foregoing method proposed by the present invention. That is, because the number of non-transmitted even columns is small, it is assumed that all of the even columns are transmitted. On this assumption, a value of D is set to 6, taking K=3 into account. Although the value of D is 2 on the assumption that only the even columns are transmitted, the value of D should be set to 6, taking K=3 into consideration.

However, the cyclic shift is repeated as "0, 1, 2, 0, 1, 2," and given that 1$^{st}$ and 3$^{rd}$ positions have high reliability in 16QAM, it can be considered that the cyclic shift values 2 and 0 are similar in performance. If a value of D is set to 4, the cyclic shift values become "0, 1, 3, 2, 3, 1". In this case also, 1 and 3 are adjacent to each other, and 3 occurs every other cyclic shift value. Therefore, it is preferable to set a value of D to 6. Setting a value of D to 4 is also a possible method, because 0 and 2 occurs alternately.

TABLE 2

|  | physical packet size (U block size) 3072 |
| --- | --- |
| Transmit duration (slot) | 1 |
| Data rate | 1.8 Mbps |
| Modulation | 16 QAM |
| Effective code rate | 0.59 |
| Transmitted Redundancy bit | 2112 (11/32 of V0/V0' block, all bits in 1$^{st}$ level of V0/V0' block is transmitted) |
| R | 4 |
| M | 8 |
| K | 3 |
| D | 1 |

Table 2 illustrates interleaving parameters for a physical packet size=3072 and a data rate=1.8 Mbps. Table 2 is different from Table 1 in that an effective code rate is increased to 0.59 to improve interleaving performance. In this case, the interleaving parameters R, M, K and D have the values shown in Table 2.

With reference to Table 2, a description will now be made of an interleaving method for a physical packet size=3072. Because the increase in the effective code rate increases the number of transmittable coded symbols, the number of redundancy symbols transmitted at initial transmission becomes 2112. In this case, because one parity symbol pair includes 3072×2=6144 symbols, a ratio of the redundancy symbols transmitted at initial transmission becomes 2112/6144=11/

32. However, because the physical packet size 3072 cannot be expressed as $2^M$, a value of K is set to 3 so that it has three levels. That is, the three-dimensional block is configured to have three x-z planes on the y-axis. Therefore, each x-z plane constituting each level has 1024 symbols. In this case, the number of the redundancy symbols actually transmitted at initial transmission is calculated not from one parity symbol pair but from one level. As a result, the number of the redundancy symbols actually transmitted at initial transmission becomes 2112/2048=33/32. Because 1/n most approximating 33/32 is n=1, D=1 is used.

A description will now be made of an interleaving apparatus according to an exemplary embodiment of the present invention.

Figure 5:
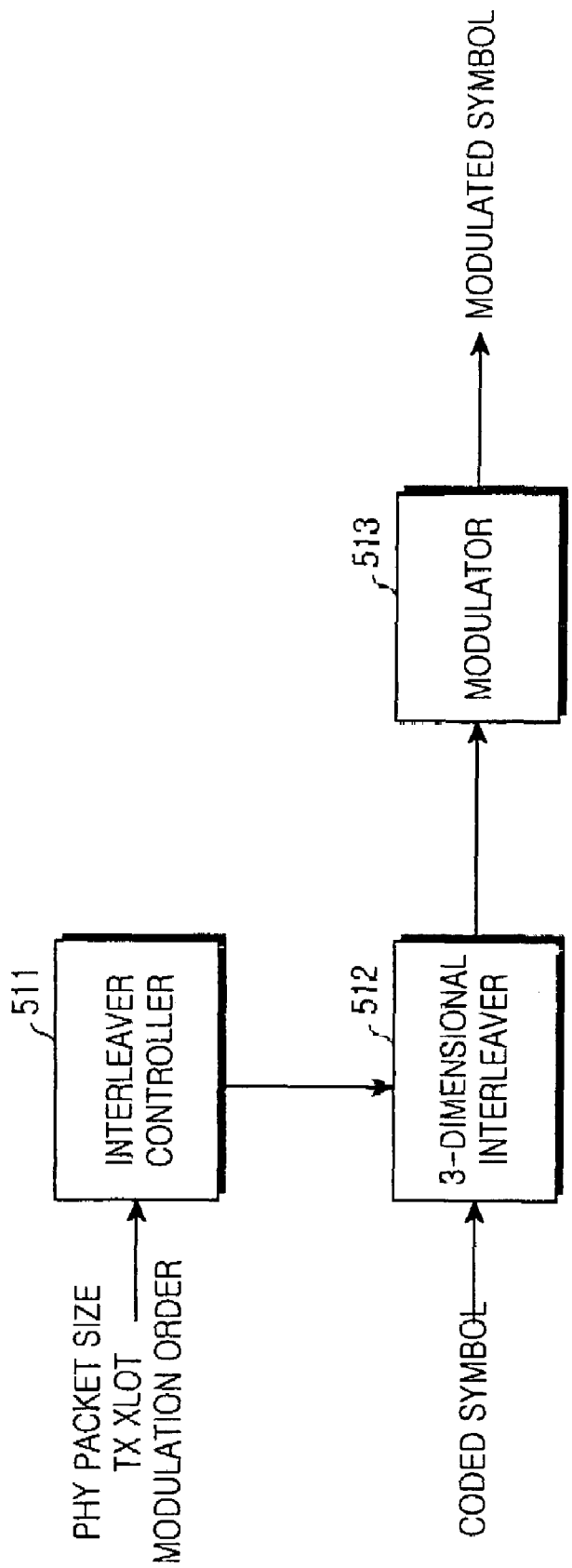
FIG. 5 is a block diagram illustrating an apparatus for performing three-dimensional interleaving according to an exemplary embodiment of the present invention.

FIG. 5 is a block diagram illustrating an apparatus for performing three-dimensional interleaving according to an exemplary embodiment of the present invention. With reference to FIG. 5, a detailed description will now be made of structure and operation of an apparatus for performing three-dimensional interleaving according to an embodiment of the present invention.

Figure 1:
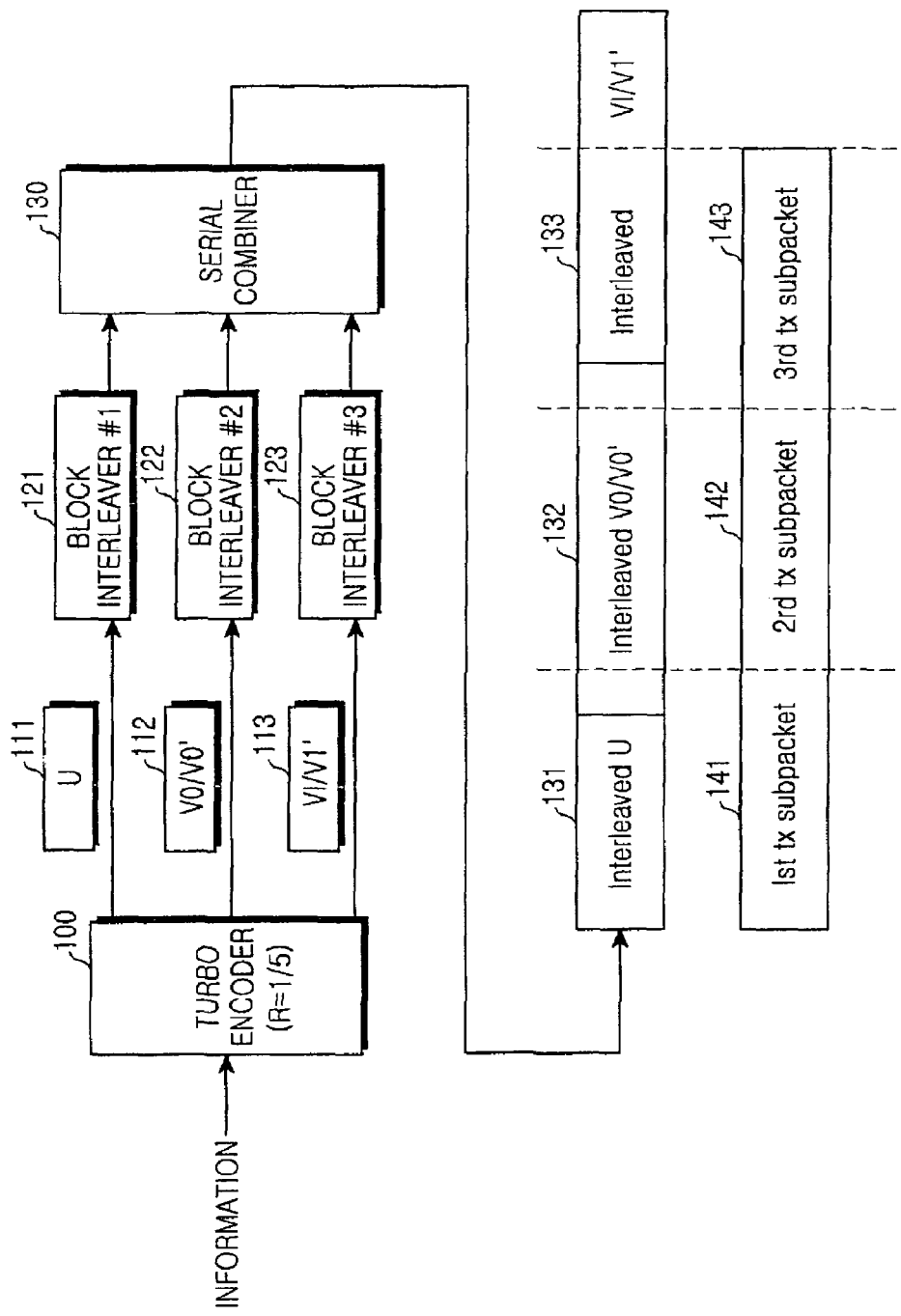
FIG. 1 is a conceptual diagram illustrating a conventional method for configuring a coded transmission symbol by coding and interleaving transmission information in a CDMA mobile communication system.
Figure 2A:
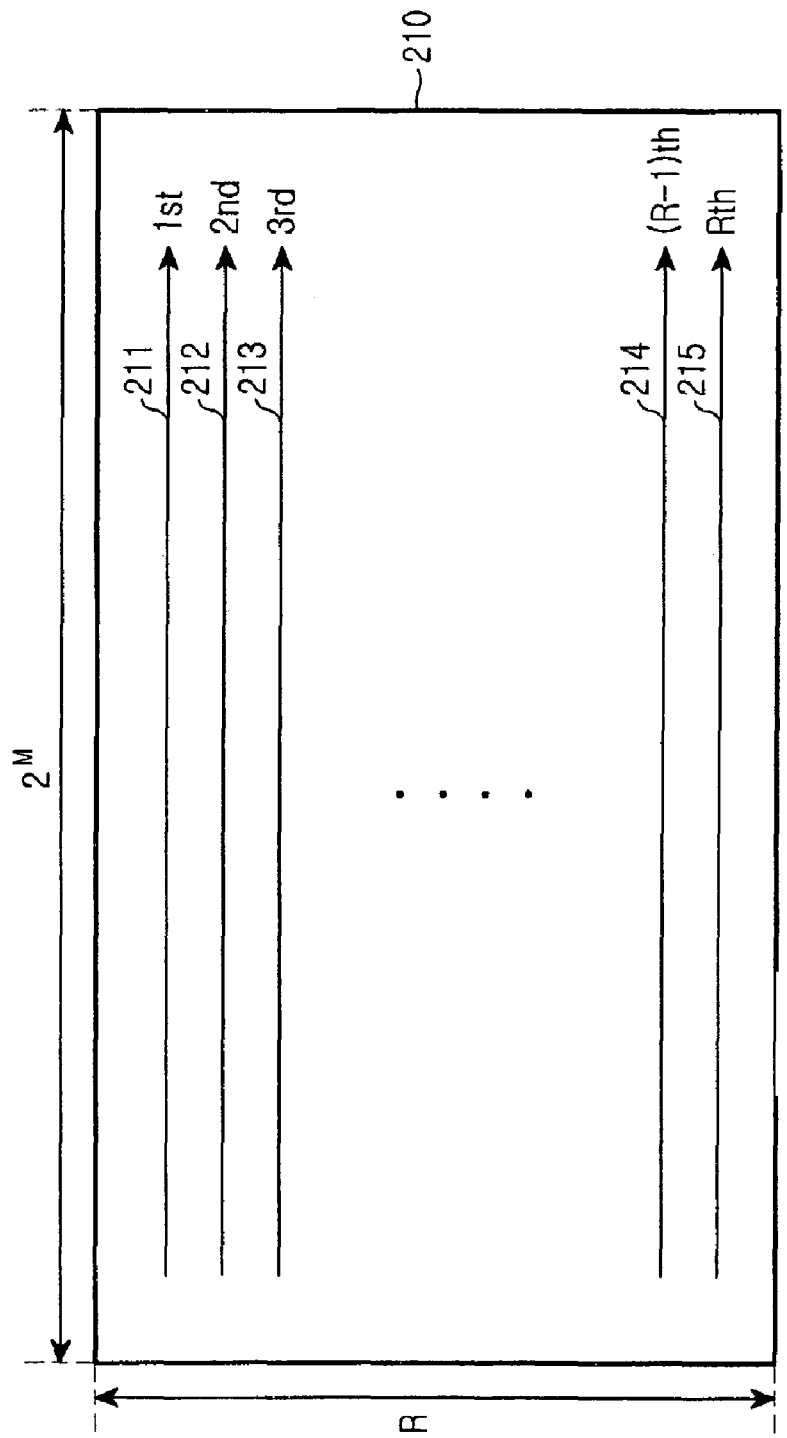
FIG. 2A is a diagram illustrating the input order of data being input to a block interleaver.
Figure 2B:
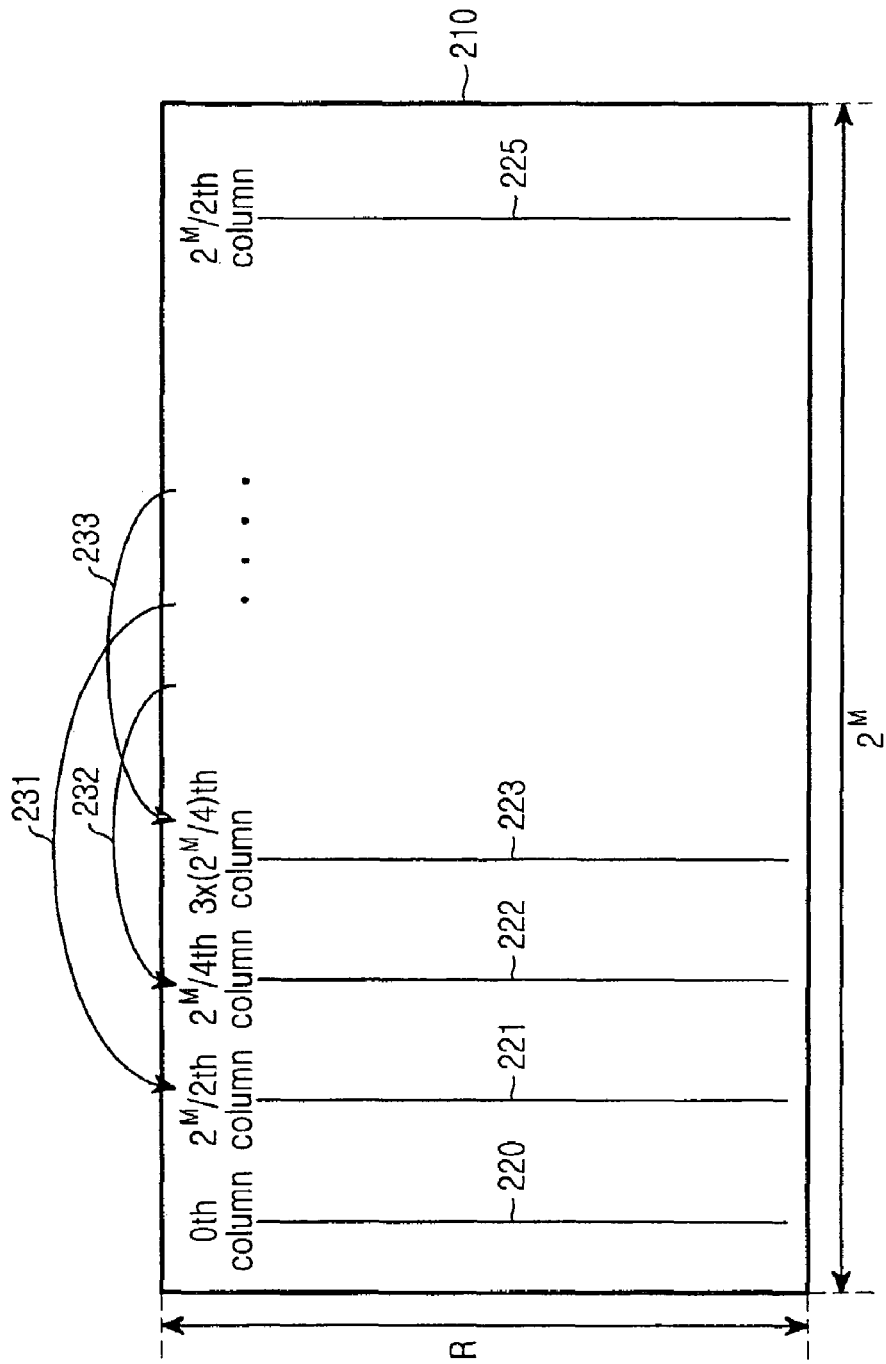
FIG. 2B is a diagram illustrating a process of determining column positions on a bit reverse order (BRO) basis in a block interleaver.
Figure 2C:
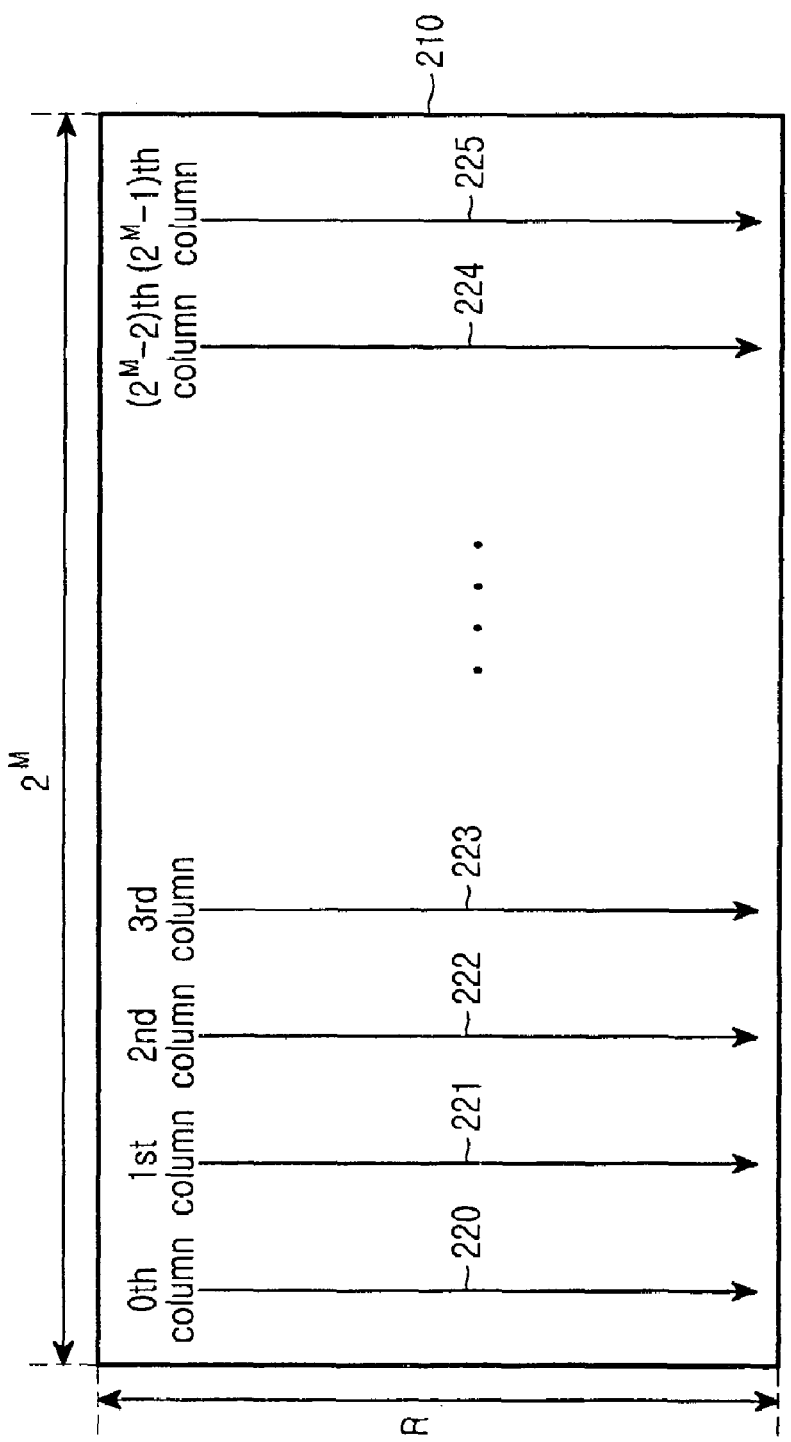
FIG. 2C is a diagram illustrating an output order of symbols in a block interleaver after BRO-based column permutation.

The apparatus according to an exemplary embodiment of the present invention includes a turbo encoder 100 shown in FIG. 1. Coded symbols output from the turbo encoder 100, including coded systematic symbols 111, a first parity symbol pair 112 and a second parity symbol pair 113, are input to a three-dimensional interleaver 512 according to an exemplary embodiment of the present invention. The three-dimensional interleaver 512, like the block interleaver shown in FIG. 1, may include a first interleaver for interleaving the coded systematic symbols 111, a second interleaver for interleaving the first parity symbol pair 112, and a third interleaver for interleaving the second parity symbol pair 113. That is, the three-dimensional interleaver 512 also interleaves the coded systematic symbols 111 and the first and second parity symbol pairs 112 and 113 independently.

The three-dimensional interleaver 512 performs interleaving under the control of an interleaver controller 511. The interleaver controller 511 receives such information as a physical packet size, the number of transmission slots, a modulation order, etc. Based on the received information, the interleaver controller 511 determines the parameters R, K, M and D for three-dimensional interleaving. The interleaver controller 511 controls an interleaving operation of the three-dimensional interleaver 512 based on values of the parameters. A detailed description of the control operation will be made later with reference to FIG. 6.

If the three-dimensional interleaver 512 is designed such that it can spontaneously perform interleaving once the parameters are given, the interleaver controller 511 can be replaced with a memory for storing parameter values mapped to each individual case. That is, the memory may store data rate, modulation order, the number of transmission slots, and physical packet size in the form of Table 1 or Table 2, read parameter values associated with them, and output the read parameter values to the three-dimensional interleaver 512. An embodiment of the present invention can be implemented with either of the methods. For convenience, it will be assumed herein that the interleaver controller 511 receives the parameter values and controls the three-dimensional interleaver 512 depending on the received parameter values.

After completion of interleaving the received coded symbols under the control of the interleaver controller 511, the three-dimensional interleaver 512 outputs the interleaved symbols to a modulator 513 in the method described with reference to FIG. 4D. Then the modulator 513 maps the interleaved symbols received from the three-dimensional interleaver 512 according to a predetermined modulation order, and outputs modulated symbols.

Figure 6:
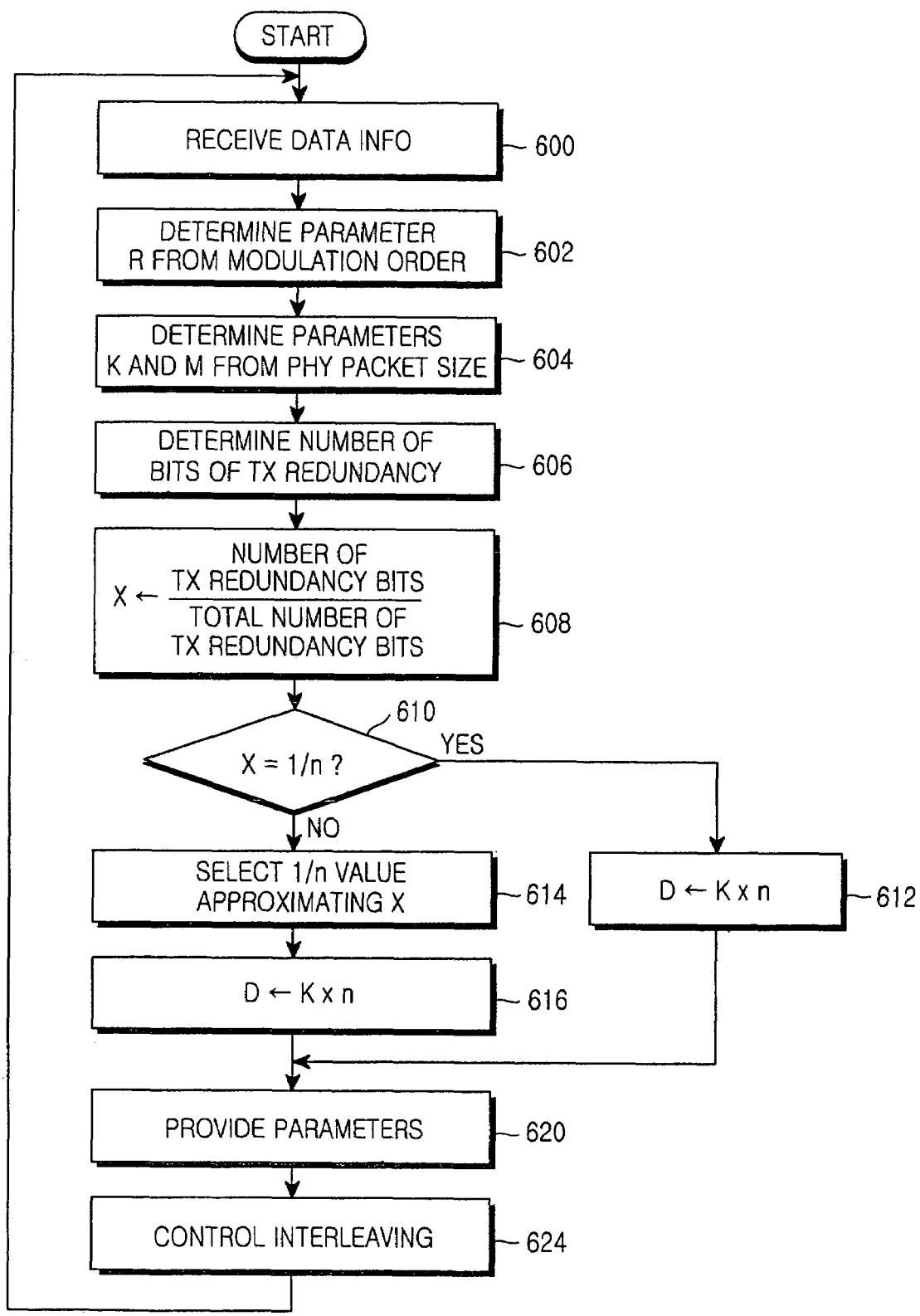
FIG. 6 is a flowchart illustrating a three-dimensional interleaving operation according to an exemplary embodiment of the present invention.

FIG. 6 is a flowchart illustrating a three-dimensional interleaving operation according to an exemplary embodiment of the present invention. With reference to FIG. 6, a detailed description will now be made of a three-dimensional interleaving process according to an embodiment of the present invention.

In step 600, an interleaver controller 511 receives transmission data information. The data information, as described above, may include a physical packet size, the number of transmission slots, a modulation order, a data rate, and so on. Upon receiving the data information, the interleaver controller 511 determines in step 602 a parameter R from the modulation order in the received data information. This is because, as described above, a value of the parameter R is determined depending on the modulation order. After determining the parameter R, the interleaver controller 511 determines in step 604 parameters K and M from the physical packet size. Because the interleaver controller 511 already has information on a z-axis value of a symbol to be received and a physical packet size should be expressed as $2^M$, the interleaver controller 511 can find a value that maximizes a value of M, from the data size, in order to perform three-dimensional interleaving. Thereafter, the interleaver controller 511 determines a value of the parameter K in order to match the number of interleaved symbols to the total number of symbols.

After determining the parameters K and M, the interleaver controller 511 determines the number of redundancy bits to be transmitted, in step 606. In other words, the interleaver controller 511 determines the number of parity symbols to be transmitted. Thereafter, in step 608, the interleaver controller 511 defines a value X by dividing the number of redundancy bits to be transmitted by the total number of redundancy bits.

The interleaver controller 511 determines in step 610 whether the value X satisfies 1/n. If it is determined in step 610 that the value X satisfies 1/n, the interleaver controller 511 sets a value of a parameter D to K×n in step 612, where n=1, 2, 4, 8, 16, . . . , and then proceeds to step 620.

However, if it is determined in step 610 that the value X calculated in step 608 does not satisfy 1/n, the interleaver controller 511 selects a value 1/n that most approximates the value X in step 614. Although the interleaver controller 511 selects a value 1/n most approximating the value X in FIG. 6 by way of example, the interleaver controller 511 can also select either a value 1/n that most; approximates the value X and is greater than the value X, or a value 1/n that most approximates the value X and is less than the value X. After selecting a value 1/n most approximating the value X as an example, the interleaver controller 511 determines in step 616 a value of the parameter D by multiplying the value n by the parameter K.

After determining all of the parameters, the interleaver controller 511 provides the determined parameters to a three-dimensional interleaver 512 in step 620. Thereafter, in step 624, under the control of the interleaver controller 511, the three-dimensional interleaver 512 stores coded symbols, performs cyclic shift and BRO process on the coded symbols, and outputs the interleaved symbols. In other words, the three-dimensional interleaver 512 performs the interleaving process of FIGS. 4A through 4D.

As can be understood from the foregoing description, the use of the proposed three-dimensional interleaver can contribute to uniform reliability distribution for modulated symbols before being transmitted. In particular, even though a transmission pattern is irregular, an exemplary embodiment of the present invention can guarantee uniform reliability distribution for the modulated symbols before transmission, thereby increasing transmission efficiency.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for interleaving symbols coded by a turbo encoder in a communication system that uses the turbo encoder for encoding transmission information into coded systematic symbols and at least one parity symbol pair, and maps the coded symbols using a second or higher modulation order before transmission, the method comprising the steps of:

defining, on a three-dimensional plane of x, y and z-axes, the modulation order as a size R of the z-axis, determining a size of the x-axis taking the size R of the z-axis into account so that a physical packet size of the transmission information has a maximum value of $2^M$, and determining a size K of the y-axis so that the size K satisfies the physical packet size;

sequentially receiving the coded symbols, and three-dimensionally storing the received coded symbols according to the sizes of the x, y and z-axes;

wherein the storing step further comprises:
a) selecting an x-y plane in which an initial symbol is stored;
b) sequentially storing the coded symbols in an x-z plane on the three-dimensional plane in a direction of the y-axis from a particular position in which the initial symbol is to be stored;
c) shifting in a direction of the x-axis from the particular position after completion of storing the coded symbols in the y-axis direction and then repeating step b); and
d) selecting a next x-y plane in a direction of the z-axis after completion of storing the coded symbols in the selected x-y plane and repeating steps b) and c);

independently performing cyclic shifting separately on the coded systematic symbols and the parity symbol pair for each x-z plane after completion of storing the coded symbols received from the turbo encoder;

wherein the cyclic shifting step comprises:
e) cyclic-shifting the coded systematic symbols according to a size of the coded symbols to be transmitted and the number of transmissions using an equation of $(K \times c + k) \mod R$, where c is a column index and k is an index corresponding to an x-z plane on the y axis; and
f) cyclic-shifting redundancy symbols constituting the remaining size of the coded symbols to be transmitted, using an equation of $\lfloor (K \times c + k)/D \rfloor \mod R$;

wherein if a ratio of the number of the redundancy symbols constituting the remaining size of the coded symbols to be transmitted to the number of symbols constituting the parity symbol pair satisfies 1/n, where n=1, 2, 4, 8, 16, . . . , a value of D is set to K×n, and if the ratio has a value of m/p, a value of 1/n is set to a value most approximating the value of m/p, and the value of D is set to a value obtained by multiplying the value n by K;

dividing y-z planes into columns and reordering the columns by bit reverse ordering (BRO) after completion of the independent cyclic shifting; and selecting an x-z plane, from which the symbols reordered in the x, y and z axes are to be output, according to the number of the coded symbols to be transmitted, determining an output order of y-z columns on the selected x-z plane, and sequentially outputting symbols in each of the determined columns in a direction of the z-axis.

2. The method of claim 1, wherein if the ratio of the number of the redundancy symbols constituting the remaining size of the coded symbols to be transmitted to the number of symbols constituting the parity symbol pair has a value of m/p, a value of n is determined such that the value of m/p most approximates 1/n and is greater than 1/n.

3. An apparatus for interleaving symbols coded by a turbo encoder in a communication system that uses the turbo encoder for encoding transmission information into coded systematic symbols and at least one parity symbol pair, and maps the coded symbols using a second or higher modulation order before transmission, the apparatus comprising:

an interleaver controller for receiving information on a size of a physical packet to be transmitted, the number of transmission slots and a modulation order, defining, on a three-dimensional plane of x, y and z-axes, the modulation order as a size R of the z-axis, determining a size of the x-axis taking the size R of the z-axis into account so that a physical packet size of the transmission information has a maximum value of $2^M$, determining a size K of the y-axis so that the size K satisfies the physical packet size, storing the coded symbols in a three-dimensional interleaver, and controlling an interleaving and outputting operation; and a channel interleaver adapted to:

sequentially receive the coded symbols, selecting, under the control of the interleaver controller, an x-y plane in which an initial symbol is to be stored according to sizes of the x, y and z-axes, sequentially store the received symbols in an x-z plane on the three-dimensional plane in a direction of the y-axis from a particular position in which the initial symbol is to be stored; after completion of storing the coded symbols in the y-axis direction, shift in a direction of the x-axis from the particular position and repeatedly sequentially store the received symbols; and after completion of storing the coded symbols in the selected x-y plane, select a next x-y plane in a direction of the z-axis and store all of the received symbols in the three-dimensional plane through repetition of the above process;

distinguish the coded systematic symbols and the parity symbol pair for each x-z plane, cyclic-shifting the coded systematic symbols according to a size of the coded symbols to be transmitted and the number of transmissions using an equation of $(K \times c + k) \mod R$, where c is a column index and k is an index corresponding to an x-z plane on the y axis; determine a cyclic shift pattern using an equation of $\lfloor (K \times c + k)/D \rfloor \mod R$ and set a value of D to K×n if a ratio of the number of the redundancy symbols constituting the remaining size of the coded symbols to be transmitted to the number of symbols constituting the parity symbol pair satisfies 1/n, where n=1, 2, 4, 8, 16, . . . ; and if the ratio has a value of m/p, set a value of 1/n to a value most approximating the value of m/p and setting the value of D to a value obtained by multiplying the value n by K; and after completion of the independent cyclic shifting, divide y-z planes into columns and reordering the columns by bit reverse ordering (BRO), select an x-z plane, from which the symbols reordered in the x, y and z axes are to be output, according to the number of the coded symbols to be transmitted, determine an output order of y-z columns on the selected x-z plane, and sequentially output symbols in each of the determined columns in a direction of the z-axis.

4. The apparatus of claim 3, wherein if the ratio of the number of the redundancy symbols constituting the remaining size of the coded symbols to be transmitted to the number of symbols constituting the parity symbol pair has a value of m/p, the channel interleaver determines a value of n such that the value of m/p most approximates 1/n and is greater than 1/n.

5. A method for interleaving symbols coded by a turbo encoder in a communication system that uses the turbo encoder for encoding transmission information into coded systematic symbols and at least one parity symbol pair, and maps the coded symbols using a second or higher modulation order before transmission, the method comprising the steps of:
cyclic-shifting the systematic symbols among the symbols coded by the turbo encoder, using an equation of (K×c+k)mod R; and
cyclic-shifting redundancy symbols constituting the remaining size of the coded symbols to be transmitted, using an equation of floor{(K×c+k)/D}mod R;
wherein K denotes a height of symbols stored on a three-dimensional plane, c denotes a column index, k denotes a plane index having a value of 0, 1, . . . , R denotes a modulation order, mod denotes a modulo operation, floor x denotes a function indicating a largest integer not greater than x, and D denotes a parameter determined depending on the number of symbols to be transmitted.

6. The method of claim 5, wherein if a ratio of the number of the redundancy symbols to be transmitted to the number of symbols constituting the parity symbol pair satisfies 1/n, where n=1, 2, 4, 8, 16, . . . , a value of the parameter D is set to a K×n.

7. The method of claim 5, wherein if a ratio of the number of the redundancy symbols to be transmitted to the number of symbols constituting the parity symbol pair has a value of m/p, a value of 1/n is set to a value most approximating the value of m/p, and a value of the parameter D is set to a value obtained by multiplying the value n by K.

8. The method of claim 5, wherein if a ratio of the number of the redundancy symbols to be transmitted to the number of symbols constituting the parity symbol pair has a value of m/p, a value of n is determined such that the value of m/p most approximates 1/n and is greater than 1/n.

9. An apparatus for interleaving symbols coded by a turbo encoder in a communication system that uses the turbo encoder for encoding transmission information into coded systematic symbols and at least one parity symbol pair, and maps the coded symbols using a second or higher modulation order before transmission, the apparatus comprising:
an interleaver controller for performing a control operation of cyclic-shifting the systematic symbols among the symbols coded by the turbo encoder depending on a size of a physical packet to be transmitted, the number of transmission slots, and the modulation order, using an equation of (K×c+k)mod R, and cyclic-shifting redundancy symbols constituting the remaining size of the coded symbols to be transmitted, using an equation of floor{(K×c+k)/D}mod R; and
an interleaver for cyclic-shifting input symbols under the control of the interleaver controller;
wherein K denotes a height of symbols stored on a three-dimensional plane, c denotes a column index, k denotes a plane index having a value of 0, 1, . . . , R denotes a modulation order, mod denotes a modulo operation, floor x denotes a function indicating a largest integer not greater than x, and D denotes a parameter determined depending on the number of symbols to be transmitted.

10. The apparatus of claim 9, wherein if a ratio of the number of the redundancy symbols to be transmitted to the number of symbols constituting the parity symbol pair satisfies 1/n, where n=1, 2, 4, 8, 16, . . . , the interleaver controller sets a value of the parameter D to a K×n.

11. The apparatus of claim 9, wherein if a ratio of the number of the redundancy symbols to be transmitted to the number of symbols constituting the parity symbol pair has a value of m/p, a value of 1/n is set to a value most approximating the value of m/p, and a value of the parameter D is set to a value obtained by multiplying the value n by K.

12. The apparatus of claim 9, wherein if a ratio of the number of the redundancy symbols to be transmitted to the number of symbols constituting the parity symbol pair has a value of m/p. the interleaver controller determines a value of n such that the value of m/p most approximates 1/n and is greater than 1/n.

13. A method for interleaving symbols coded by a turbo encoder in a communication system that uses the turbo encoder for encoding transmission information into coded systematic symbols and at least one parity symbol pair, and maps the coded symbols using a second or higher modulation order before transmission, the method comprising the step of:
cyclic-shifting the coded symbols using an equation of floor c/D mod R;
wherein c denotes a column index, R denotes a modulation order, mod denotes a modulo operation, and floor x denotes a function indicating a largest integer not greater than x;
wherein if a ratio of the number of redundancy symbols to be transmitted to the number of symbols constituting the parity symbol pair satisfies a value of 1/n, where n=1, 2, 4, 8, 16, . . . , D is set to n; and if the ratio has a value of m/n, D is set to a value of n obtained by setting 1/n to a value most approximating m/n, or D is set to a value of n obtained by selecting a value determined such that m/n most approximates 1/n and is greater than 1/n.

14. An apparatus for interleaving symbols coded by a turbo encoder in a communication system that uses the turbo encoder for encoding transmission information into coded systematic symbols and at least one parity symbol pair, and maps the coded symbols using a second or higher modulation order before transmission, the apparatus comprising:
an interleaver controller for performing a control operation of cyclic-shifting the coded symbols using an equation of floor c/D mod R ; and
an interleaver for interleaving the coded symbols under the control of the interleaver controller;
wherein c denotes a column index, R denotes a modulation order, mod denotes a modulo operation, and floor x denotes a function indicating a largest integer not greater than x;
wherein if a ratio of the number of redundancy symbols to be transmitted to the number of symbols constituting the parity symbol pair satisfies a value of 1/n, where n=1, 2, 4, 8, 16, . . . , D is set to n; and if the ratio has a value of m/n, D is set to a value of n obtained by setting 1/n to a value most approximating m/n, or D is set to a value of n obtained by selecting a value determined such that 1/n most approximates m/n and is greater than m/n.

15. An apparatus for interleaving symbols coded by a turbo encoder in a communication system that uses the turbo encoder for encoding transmission information into coded systematic symbols and at least one parity symbol pair, and maps the coded symbols using a second or higher modulation order before transmission, the apparatus comprising:

a memory for storing parameters D and R for cyclic-shifting the coded symbols according to a rule of floor c/D mod R, and outputting a value corresponding to a size of information bits for interleaving of the coded symbols; and an interleaver for interleaving the coded symbols according to the value output from the memory;

wherein c denotes a column index, R denotes a modulation order, mod denotes a modulo operation, and floor x denotes a function indicating a largest integer not greater than x;

wherein if a ratio of the number of redundancy symbols to be transmitted to the number of symbols constituting the parity symbol pair satisfies a value of 1/n, where n=1, 2, 4, 8, 16, . . . , D is set to n; and if the ratio has a value of m/n, D is set to a value of n obtained by setting 1/n to a value most approximating m/n, or D is set to a value of n obtained by selecting a value determined such that 1/n most approximates m/n and is greater than m/n.

16. An apparatus for interleaving symbols coded by a turbo encoder in a communication system that uses the turbo encoder for encoding transmission information into coded systematic symbols and at least one parity symbol pair, and maps the coded symbols using a second or higher modulation order before transmission, the apparatus comprising:

a memory for, if the number of information bits to be transmitted is 2048, storing parameters given in the following table for cyclic-shifting the coded symbols according to a rule of floor c/D mod R, and outputting the parameters stored in the table; and an interleaver for interleaving symbols coded from the 2048 information symbols according to the parameters read from the memory.

|   | Physical packet size 2048 |
|---|---|
| R | 4 |
| M | 9 |
| D | 2 |

* * * * *